W. B. PARSONS.
LAND ROLLERS.

No. 179,599. Patented July 4, 1876.

Witnesses:

Inventor:
W. B. Parsons
by Dodge & Son
Attys

UNITED STATES PATENT OFFICE.

WILLIAM B. PARSONS, OF NUNDA STATION, NEW YORK.

IMPROVEMENT IN LAND-ROLLERS.

Specification forming part of Letters Patent No. 179,599, dated July 4, 1876; application filed May 8, 1876.

*To all whom it may concern:*

Be it known that I, WILLIAM B. PARSONS, of Nunda Station, in the county of Livingston and State of New York, have invented certain Improvements in Land-Rollers, of which the following is a specification:

My invention consists of certain improvements in the construction of field-rollers, as hereinafter more fully described.

Figure 1:
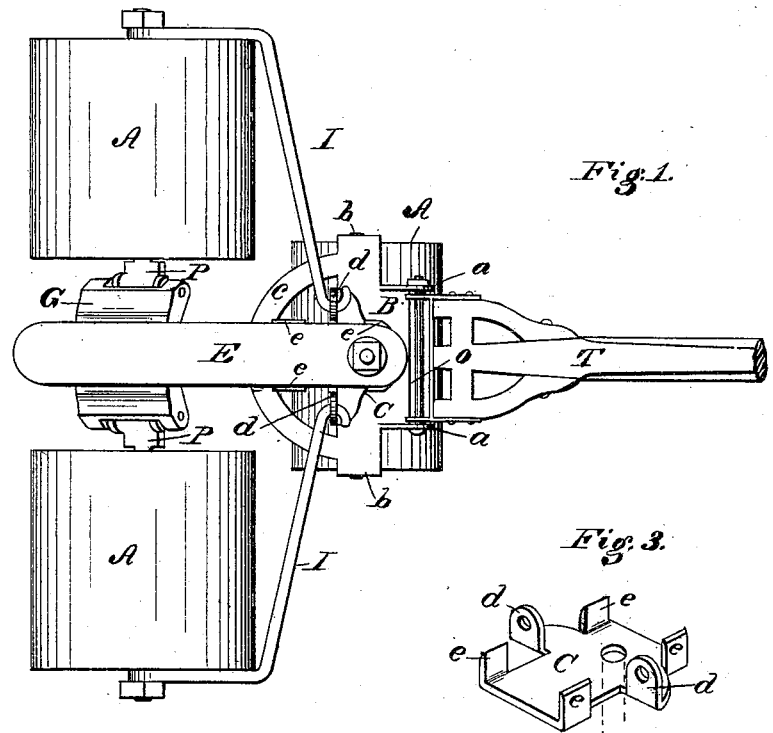
Figures 3, 4:
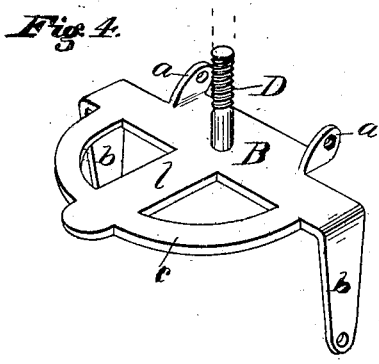
Figure 2:
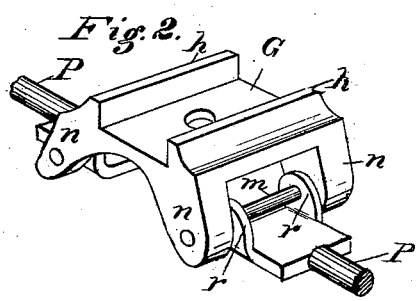

Figure 1 is a top plan view, and Figs. 2, 3, and 4 are views of portions shown in detail.

In constructing a roller on my plan I provide three rollers, A, which may be of wood or metal, as preferred, the two rear rollers being of uniform size, while the front one is of less diameter, as represented in Fig. 1.

The front roller is mounted in a metallic frame, B, the form of which is clearly shown in Fig. 4. It consists of a cross-bar, having pendent arms b, at each end, to which is secured the axis or journal of the roller, with two vertically-projecting ears, a, at its front end, for attaching the tongue T by a bolt, o, as shown in Fig. 1. It also has a semicircular bar or plate, c, projecting from its rear side, which, for strengthening it, is connected by a bar, l, to the main plate, though this may be omitted, if desired.

The front roller, being secured in this frame B, is connected to the two rear rolls by a bar, E, as shown in Fig. 1, and at its front end this bar E has secured to its under face a plate, C, which is shown detached in Fig. 3. This plate C, as there shown, is made with a central hole for the pivot-bolt D of plate B. It also has four vertical lips or lugs, e, by which it is held securely in place on the bar E, as shown. In addition to these it is also provided with two other vertical ears or lugs, d, which have holes in them for attaching the ends of brace-rods I, as shown in Fig. 1.

To the rear end of the bar E I secure a metallic plate, G, constructed as shown in Fig. 2. This plate is cast with vertically-projecting ribs h, thus forming on its upper face a recess of proper size to permit the bar E to fit in, and to which it is secured by one or more bolts. This plate G is also provided at each side with two downwardly-projecting ears, n, between which, by rods or bolts m, are pivoted the journals P of the rear rollers, one on each side, as shown in Figs. 1 and 2. These journals P are each constructed with a flat plate at their inner ends, on which, as shown in Fig. 2, are two ears or lugs, r, through which the bolt m passes, as well as through the ears n of plate G, thus forming hinge-joints, so that each of the rear rollers is free to rise or fall at its outer end, to accommodate itself to the inequalities of the ground.

The journals P are made in the form of round rods, of such a length as to extend entirely through the rollers lengthwise, and project a short distance beyond; and on their projecting ends I slip the end of a brace-rod, I, formed, as shown in Fig. 1, and secure it, with the roller thereon, by a nut or other suitable means—this rod I having its front end hooked into the ear d of plate C, as shown in Fig. 1, thus bracing the journal P and preventing undue strain on the joints where they are hinged to the plate G, and at the same time permitting a free movement of the parts, as described.

By this method of constructing the metal portions B, C, and G, they can be cast complete, with the exception of the holes for the bolts, and the journals P may also be cast complete; or, if preferred, the round portion which forms the axis for the rollers may be made of wrought-iron, and may have the head, with its ears r, cast on the wrought part, or it may be secured thereto by bolts or rivets, as may be preferred. The entire frame, with the exception of the bar E, is thus made of metal, and in a manner which renders it exceedingly simple and cheap to construct, and is, moreover, very durable.

It is obvious that, if desired, a seat for the driver may be mounted on the bar E, or a box may be secured thereon for adding weight, when desired.

Having thus described my invention, what I claim is—

1. The plate or frame B, provided with the segment c, the pendent arms b for securing the roller, and the ears a, for securing the tongue, constructed substantially as shown and described.

2. The plate C, with the perforated ears d, for hinging the brace-rods I, and lugs e, for holding it in place on the bar E, substantially as described.

3. The plate G, provided with the ears $n$ in combination with the roller-journals P, provided with the ears $r$, both constructed and arranged to operate substantially as shown and described.

4. The journals P P, hinged so as to permit the rollers to move in a vertical plane at their outer ends, in combination with the angular rigid brace-rods I, one end of said rods being secured to the outer ends of said journals, and their other ends being hinged to the frame in front, substantially as shown and described.

WILLIAM B. PARSONS.

Witnesses:
GEO. W. DAGGETT,
D. P. CARTWRIGHT.